United States Patent Office 3,661,887
Patented May 9, 1972

3,661,887
PROCESS FOR CURING SILICONE RUBBER COMPOSITIONS USING HARADA COMPLEXES AS CATALYSTS
John R. Leebrick, Old Lyme, Conn., assignor to Cosan Chemical Corporation, Clifton, N.J.
No Drawing. Continuation-in-part of application Ser. No. 665,981, Sept. 7, 1967. This application May 6, 1970, Ser. No. 35,289
Int. Cl. C08h 9/00
U.S. Cl. 260—18 S         9 Claims

ABSTRACT OF THE DISCLOSURE

In a process for curing silicone rubber based on organosiloxane polymers to the solid state, significant improvements are achieved using as the curing catalyst a Harada complex characterized by the empirical formula

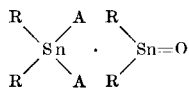

in which each of the R groups represent an alkyl group containing 1 to 8 carbon atoms and A represents a carboxylic acid radical containing 1 to 22 carbon atoms.

---

This application is a continuation-in-part of application, Ser. No. 665,981, filed Sept. 7, 1967, now abandoned.

This invention relates to curing silicone rubber based on organosiloxane polymers to the cured solid state and the resultant products.

Many catalysts are presently in use for curing silicone rubbers. Among these catalysts are the carboxylic acid salts of certain metals. One group of such catalysts which have been used commercially includes the organo-tin dicarboxylates such as dibutyl tin dilaurate.

Although such catalysts have been widely used in commercial applications, they are possessed of certain disadvantages which make their continued use unacceptable. Among these disadvantages are their relatively long curing times, their corrosive action with respect to metal surfaces, the latter making them unsuitable for coating or encapsulating electronic devices and their tendency to chain scissions, i.e., spltting of the cross linkages between polymer chains, giving rise to a weakening of the polymer structure.

It is an object of the present invention to provide improved organo tin catalysts for use in curing silicone rubber.

It is a further object to provide a resin-catalyst composition which has a shorter curing time, which is non-corrosive and which does not give rise to chain scission.

These and other objects and advantages of the invention will be apparent from the following detailed description.

The catalysts as used heretofore, i.e., the organo-tin dicarboxylates are generally prepared by reacting one mole of a dialkyl tin oxide with two moles of a carboxylic acid or by reacting one mole of a dialkyl tin halide with two moles of carboxylic acid in the presence of a base. The resulting organo tin carboxylates contain varying amounts of free acid which, it has been established, in part gives rise to the above-mentioned problems.

In accordance with the invention, it has now been found that the addition of an organo tin carboxylate having negligible amounts to free acid to silicone rubber results in a faster cure and a more durable cure, the cured products being characterized by their stability, absence of corrosion and improved physical properties.

The catalyst component of the compositions of the present invention are prepared by the reaction of one mole of dialkyl-tin oxide with one mole of a carboxylic acid. As has been mentioned above, the resulting basic organo-tin carboxylate contains negligible amounts of free acid. The rate of catalysis is faster than that with the known catalysts and can be carried out at room temperature. The catalysts do not in any way contribute to chain scission.

The improved catalyst used in the practice of the present invention corresponds to the empirical formula

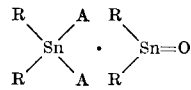

wherein R is alkyl containing from 1–8 carbon atoms such as methyl, ethyl, propyl, butyl, hexyl and octyl and is preferably methyl, A is a carboxylic acid radical containing from 1–22 carbon atoms and includes groups such as formate, acetate, propionate, butyrate, versatate (ethylene diamino tetraacetate) octoate, 2-ethylhexoate, pelargonate, decanoate, neodecanoate, laurate, oleate, stearate and preferably is a laurate, neodecanoate or oleate group.

The catalyst need be present only in very small amounts and preferably is used in amounts of 0.1% to 5% and most preferably 0.5% to 2%.

The catalysts have been identified by the term Harada complex and have been so referred to in the literature (Investigations In The Field Of Organotin Chemistry; Luijten and Van de Kerk, Tin Research Institute; Harada, T.; Sci. Papers Inst. Phys. Chem. Research (Tokyo), 35,290 (1939); Chem. Zentr. (1939) II, 2912. Harada, T., Sci. Papers nst. Phys. Chem. Research (Tokyo), 38, 146 (1940); C. A., 35, 2470 (1941). (Harada, T., C.A., 43, 4632 (1949).)

The silicone rubber materials employed herein are based on organosiloxane polymers. The polymers of particular interest have the formula $XO[R_2SiO]_nX$ where each X is alkyl or hydrogen, each R is alkyl, aryl, alkenyl, halogenated alkyl or halogenated aryl and $n$ has a value of at least 50. Such polymers can be described as difunctional diorganosiloxane polymers or alkoxy- or hydroxy-endblocked diorganosiloxane polymers. It is preferred that at least 80% of the R substituents be alkyl and particularly methyl and ethyl. However, the organic substituents can be methyl, ethyl, propyl, nonyl, octadecyl, phenyl, xenyl, vinyl, allyl, perchloromethyl, 3,3,3-trifluoropropyl, bromoethyl, chlorofluorophenyl, etc. Of particular interest because of commercial availability are the hydroxy endblocked dimethylpolysiloxane polymers. The operable polymers can vary from relatively thin fluids having viscosities of about 50 cs. at 25° C. to gumlike materials having viscosities measured in millions of cs. at 25° C. but remaining soluble in benzene and other organic solvents.

Silicone rubbers are often designated "RTV" silicones. These RTV compounds are most advantageously used in accordance with the invention. In general, the RTV silicones comprise an essentially linear hydroxyl endblocked diorganosiloxane polymer with or without a filler. These latter polymers are generally defined by the formula

$$XOR_2SiO[R_2SiO]_nSiR_2OX$$

where each X is hydrogen, alkyl or aryl, and is preferably hydrogen, each R is a monovalent hydrocarbon radical such as alkyl, aryl, alkenyl, alkaryl, aralkyl or cycloaliphatic, or a halogenated monovalent hydrocarbon radical such as chloro-, bromo or fluoroalkyl, aryl or alkenyl, and $n$ has an average value of 50 or more. The operative polymers in this case also vary from relatively low viscosity fluids to high polymeric gums soluble in organic solvents. Although the operative polymers are essentially linear, minor amounts of mono-organosiloxane units ($RSiO_{3/2}$ units) can be tolerated and although the polymers are generally endblocked with terminal —OX groups, minor amounts of $R_3SiO_{1/2}$ units may be present. The operable siloxane polymers can be homopolymers such as hydroxy endblocked dimethyl siloxane, copolymers such as hydroxy and alkoxy endblocked dimethylphenyl-methylsiloxane copolymers or mixtures of homopolymers and/or copolymers. Specific organic radicals represented by R can be illustrated by methyl, ethyl, nonyl, octadecyl, phenyl, diphenyl, anthracyl, tolyl, xylyl, ethylphenyl, methylnaphthyl, benzyl, phenylethyl, cyclopropyl, cyclo-butyl, cyclohexenyl, vinyl, allyl and octadecenyl as well as halogen substituted derivatives of such radicals including chloromethyl, bromomethyl, fluoromethyl, perchloroethyl, chlorofluoroethyl, bromophenyl, 3,3,3-trifluoroproply, $\alpha,\alpha,\alpha$-trichlorotolyl, chlorobenzyl, perfluorocyclopropyl, chlorodifluorovinyl and chloroallyl.

In order that those skilled in the art may better understand how the present invention may be practiced, the following examples are presented:

EXAMPLE 1

164.7 g. (1.0 mole) of dimethyltin oxide and 282.45 g. (1.0 mole) of oleic acid were introduced into an open reactor equipped with stirrer, heating means, and thermometer. The mixture was heated, while being thoroughly stirred at 120° C. until all of the water had been eliminated. The Harada complex, which was obtained in the form of a light yellow, moderately viscous product, could be used directly for admixture with the resin to be cured.

EXAMPLE 2

A Harada complex was prepared by reacting 248.9 g. (1.0 mole) dibutyltin oxide and 200.3 g. (1.0 mole) of lauric acid as described in Example 1. The resulting product was directly used as the catalyst for curing resin.

EXAMPLE 3

To 50 g. of RTV-60 [1] (General Electric's room temperature vulcanizing silicone), there was added 1 g. of a catalyst prepared as set out in Example 1 and the mixture then stirred thoroughly at room temperature.

In a similar manner, a composition was prepared with a commercial catalyst, viz., dibutyltin dilaurate. The curing times were then compared at room temperature. The values which were obtained are as follows:

| Catalyst | Concentration, percent | Tack-free time, minutes |
|---|---|---|
| Basic dimethyltin oleate | 1 | [1] 27 |
| Harada complex of dimethyltin oxice and oleic acid | 0.5 | 77 |
| Commercial dibutyltin dilaurate | 1 | [2] 99 |

[1] Tough cure. [2] Fairly tough cure.

EXAMPLE 4

Curing at elevated temperature is described in this example.

1 g. of a catalyst prepared as set out in Example 1 was added to 50 g. of RTV-602 [1] (General Electric's elevated temperature vulcanizing silicone) and the resultant mixture stirred throughly.

1 g. of the commercially used catalyst, i.e., dibutyl tin dilaurate was added to another batch of the same silicone and the mixture treated as just set out above.

[1] The expression RTV is conventionally used in designating silicone rubbers and has been used not only in the trade literature particularly by General Electric but also in the patent literature, see for instance, U.S. Pats. 3,070,566 and 3,065,194 wherein these very compositions have been defined in considerable detail. RTV-60 is a dimethyl RTV compound marketed by General Electric as being especially suited to high temperature applications. It has a viscosity of about 500 poises and pours without difficulty. RTV-602 is another dimethyl RTV compound marketed by General Electric for the same purposes as the RTV-60. It has a viscosity of about 12 poises and is easily pourable.

| Catalyst | Gel time, in mins. |
|---|---|
| Harada complex of dimethyltin oxide and oleic acid | 10 |
| Commercial dibutyltin dilaurate | 120 |

EXAMPLE 5

Using the procedure described in Example 3, the curing effectiveness of the Harada complex of dibutyltin oxide and lauric acid which had been prepared as described in Example 2 was compared with the commercially available catalyst dibutyl tin dilaurate at room temperature. The results of the comparison are set out in the following:

| Catalyst | Concentration, percent | Tack-free time, minutes |
|---|---|---|
| Commercial dibutyltin dilaurate | 1 | 180 |
| Harada complex of dibutyltin oxide and lauric acid | 1 | 74 |

The effectiveness of the catalysts as curing agents at elevated temperature was determined using the procedure described in Example 4 and compared the basic dibutyltinlaurate with the commercially available dibutyltindilaurate at 100° C. The time for gelling to take place amounted to in the case of the catalyst in accordance with the invention was only a fraction of that which was required for gelling of the compositions where the coventional catalysts were used.

The compositions can also contain pigments of a type which are conventionally incorporated into resin compositions.

The compositions of the present invention are particularly adapted for caulking and sealing applications where adhesion to various surfaces is important. For example, these materials are useful in household caulking applications and in industrial applications, such as on buildings, factories, automotive equipment, and in applications where adhesion to masonry, plastic, metal and wood is required. The materials are especially useful in applications where adhesion to stainless steel and aluminum surfaces is desired because of their markedly improved adhesion to various surfaces and their absence of corrosion. They are also especially suited for encapsulation of transformers, coils and motors, and for fabrication of rubber parts where their toughness provides maximum protection. The materials can also be used for release applications and flexible molds.

In order to establish that the compositions of the invention, i.e., that the compositions cured with the Harada complex as catalyst have unique properties as compared to compositions cured with the conventional catalyst, a series of experiments were carried out as hereinafter set out using three batches containing resin RTV-60 (dimethyl silicone rubber) and as the curing catalysts dibutyltin dilaurate and the Harada complex of dimethyltin oxide and oleic acid as follows:

| | Parts per hundred resins | | |
|---|---|---|---|
| | #1 | #2 | #3 |
| RTV-60 | 100 | 100 | 100 |
| Dibutyltin dilaurate | 0.5 | | |
| Harada complex of dimethyltin oxide and oleic acid | | 0.5 | 0.33 |

The batches were cast into sheets having an approximate thickness of 85 mils.

Curing characteristics

In order to compare the curing time, all samples were tested periodically for tack and hardness. The hardness was measured using a Shore A-2 Durometer. Tack free time is the time after which all surface tack is eliminated.

| Time, hrs. | Shore A-2 hardness | | |
|---|---|---|---|
| | #1 | #2 | #3 |
| 2½ hrs | Not gelled, tacky | Not gelled, tacky | Not gelled, tacky |
| 3½ hrs | do | 45 | Do. |
| 4 hrs | do | 45 | 25. |
| 5 hrs | Tacky | 50 | 29. |
| 22 hrs | 58 | 60 | 58. |

The data in the table above show that much faster curing was obtained using 0.5% of the Harada complex of dimethyltin oxide and oleic acid, and even with a decreased amount of this catalyst (to account for its higher metal content), the results were still significantly better than those obtained with the control sample. The control sample was still tacky after 5 hours, while the samples No. 2 and No. 3 reached the tacky state after 3½ and 4 hrs., respectively.

Heat aging

The weighed samples were left in the oven at 480° F. for 24 hrs. The dimensions of the samples were 1" x 1" x 0.85". The weight loss was measured. Subsequently, hardness of the heat-aged specimens were determined.

Weight loss on heat aging—24 hrs., 480° F.

Sample #: Percent wt. loss
1 _____ 16.6
2 _____ 13.1
3 _____ 11.5

From the results in the above table, it can be seen that the weight loss of the Harada complex of dimethyltin oxide and oleic acid catalyzed samples is significantly less than that of the control sample.

Mechanical properties of heat-aged samples

Shore A Hardness:
1 _____ 61
2 _____ 68
3 _____ 67

Again, the Harada complex of dimethyltin oxide and oleic acid catalyzed samples showed better results than the control.

Flexibility

Flexibility of the room-temperature-cured samples was measured using a Clash & Berg apparatus (see ASTM D-1043-61T test for torsional properties of plastics). The test was performed using 2g load.

| Sample number | Mean (room temp.) | Mean (0° C.) | Mean (100° C.) |
|---|---|---|---|
| 1 | 128 | 79 | 145 |
| 2 | 72 | 51 | 87 |
| 3 | 87 | 62 | 110 |

Each means value represents 5 separate determinations.

The values for the Harada complex of dimethyltin oxide and oleic acid cured samples are indicative of a more extensive and complete curing.

What is claimed is:

1. In a process for curing silicone rubber based upon vulcanizable organosiloxane polymers containing hydroxy, alkoxy or aryloxy termination to the solid state, the improvement which comprises conducting the curing reaction in the presence of a catalytic amount of a Harada complex empirically characterized by the formula

in which the R groups represent alkyl groups containing from 1 to 8 carbon atoms and the A groups represent carboxylic acid radicals containing from 1 to about 22 carbon atoms, the Harada complex being characterized by the substantial absence of free acid.

2. The process according to claim 1, in which the curing reaction is conducted in the presence of from about 0.1 to about 5% by weight of the Harada complex, based on the weight of the silicone rubber used in such reaction.

3. The process according to claim 1, in which the R groups are selected from methyl, butyl or octyl.

4. The process according to claim 3, in which each R group is a methyl group.

5. The process according to claim 3, in which each R group is a butyl group.

6. The process according to claim 3, in which each R group is an octyl group.

7. The process according to claim 1, in which each A group is a 2-ethylhexoate.

8. The process according to claim 1, in which each A group is a laurate.

9. The process according to claim 1, in which each A group is an oleate.

References Cited
UNITED STATES PATENTS

| 2,445,794 | 7/1948 | Marsden | 260—46.5 |
| 3,065,194 | 11/1962 | Nitzsche et al. | 260—37 |
| 3,070,566 | 12/1962 | Nitzsche et al. | 260—37 |
| 3,240,730 | 3/1966 | Hostettler et al. | 260—2.5 |

DONALD E. CZAJA, Primary Examiner

M. I. MARQUIS, Assistant Examiner

U.S. Cl. X.R.

117—135.1; 252—431 C; 260—37 SB, 46.5 G

PO-1050
(5/69)

UNITED STATES PATENT OFFICE
CERTIFICATE OF CORRECTION

Patent No. 3,661,887          Dated  May 9, 1972

Inventor(s)  John R. Leebrick

It is certified that error appears in the above-identified patent and that said Letters Patent are hereby corrected as shown below:

Col. 1, Line 63 "of carboxylic acid" should read --of a carboxylic acid--;

Line 69 "amounts to free" should read --amounts of free--.

Col. 2, Line 33 "Sci. Papers nst. Phys." should read --Sci. Papers Inst. Phys.--;

Lines 34 and 35 "(Harada...(1949).)" should read --Harada... (1949).--.

Col. 3, Line 51 "Basic dimethyltin oleate" should read --Harada complex of dimethyltin oxide and oleic acid--;

Line 52 "of dimethyltin oxice" should read --of dimethyltin oxide--.

Col. 4, Lines 24 and 25 "basic dibutyltinlaurate" should read --Harada complex of dibutyltin oxide and lauric acid--.

Lines 25 and 26 "dibutyltindilaurate" should read --dibutyltin dilaurate--.

Col. 5, Line 16 "No. 3 reached the tacky" should read --No. 3 reached the non-tacky--.

Signed and sealed this 5th day of December 1972.

(SEAL)
Attest:

EDWARD M. FLETCHER, JR.
Attesting Officer

ROBERT GOTTSCHALK
Commissioner of Patents